(12) United States Patent
Zetterstrand et al.

(10) Patent No.: US 10,968,973 B2
(45) Date of Patent: Apr. 6, 2021

(54) CLUTCH ACTUATING ARRANGEMENT

(71) Applicant: VOLVO TRUCK CORPORATION, Gothenburg (SE)

(72) Inventors: Lars Zetterstrand, Gothenburg (SE); Fredrik Sjöqvist, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 54 days.

(21) Appl. No.: 16/306,236

(22) PCT Filed: May 23, 2017

(86) PCT No.: PCT/EP2017/062350
§ 371 (c)(1),
(2) Date: Nov. 30, 2018

(87) PCT Pub. No.: WO2017/207334
PCT Pub. Date: Dec. 7, 2017

(65) Prior Publication Data
US 2019/0293138 A1   Sep. 26, 2019

Related U.S. Application Data

(60) Provisional application No. 62/343,033, filed on May 30, 2016.

(51) Int. Cl.
*F16D 67/04* (2006.01)
*F16D 65/18* (2006.01)
(Continued)

(52) U.S. Cl.
CPC ............ *F16D 67/04* (2013.01); *F16D 21/00* (2013.01); *F16D 48/02* (2013.01); *F16D 65/186* (2013.01);
(Continued)

(58) Field of Classification Search
CPC ........ F16D 67/04; F16D 65/186; F16D 48/02; F16D 21/00; F16D 2048/0287;
(Continued)

(56) References Cited

U.S. PATENT DOCUMENTS 2,693,341 A * 11/1954 Fox ..................... B66D 5/26
                                                              254/370
2,836,270 A *  5/1958 Leopold ................ B66D 1/14
                                                              192/12 C
(Continued)

FOREIGN PATENT DOCUMENTS

CN       202867665 U    4/2013
DE         3426150 A1   1/1986
(Continued)

OTHER PUBLICATIONS

Chinese Office Action dated Dec. 3, 2019 in CN Application No. 201780033372.6, 6 pages.
(Continued)

*Primary Examiner* — Mark A Manley
(74) *Attorney, Agent, or Firm* — Venable LLP; Jeffri A. Kaminski

(57) ABSTRACT

The present invention relates to a clutch arrangement (500) of a vehicle transmission arrangement (100), the clutch arrangement (500) being positioned within a clutch bell housing (206) of the vehicle transmission and comprising a pneumatically controlled actuator arrangement (208) connectable to a first clutch unit (202) of the vehicle transmission arrangement (100) and arranged to controllably position the first clutch unit (202) between a closed position and an opened position, a pneumatically controlled brake actuator arrangement (210) connectable to a second clutch unit (204) of the transmission arrangement and arranged to controllably position the second clutch unit (204) between a closed position and an opened position, and a valve unit (302)

(Continued)

connected to the pneumatically controlled actuator arrangement (208) and the pneumatically controlled brake actuator arrangement (210), wherein the valve unit (302) comprises a clutch valve (308) arranged in fluid communication with the pneumatically controlled actuator arrangement (210) for controlling supply of compressed air to the pneumatically controlled actuator arrangement (210), and a brake valve (318) arranged in fluid communication with the pneumatically controlled brake actuator arrangement (210) for controlling supply of compressed air to the pneumatically controlled brake actuator arrangement (210).

12 Claims, 4 Drawing Sheets

(51) Int. Cl.
| | | |
|---|---|---|
| *F16D 48/02* | (2006.01) | |
| *F16D 21/00* | (2006.01) | |
| *F16D 55/40* | (2006.01) | |
| *F16D 121/04* | (2012.01) | |

(52) U.S. Cl.
CPC ...... *F16D 55/40* (2013.01); *F16D 2048/0287* (2013.01); *F16D 2121/04* (2013.01); *F16D 2500/1028* (2013.01); *F16D 2500/10412* (2013.01)

(58) Field of Classification Search
CPC ... F16D 2500/10412; F16D 2500/1028; F16D 2121/04; F16D 55/40; F16D 2048/0224; F16D 2121/08; F16D 2500/1112
See application file for complete search history.

(56) References Cited

U.S. PATENT DOCUMENTS

| | | | |
|---|---|---|---|
| 3,058,562 A * | 10/1962 | Andrus | F16D 67/04 |
| | | | 192/106 F |
| 3,744,606 A * | 7/1973 | Bucksch | F16D 25/0638 |
| | | | 192/48.618 |
| 4,231,455 A | 11/1980 | Fuehrer | |
| 4,456,109 A | 6/1984 | Bottomley et al. | |
| 4,562,907 A | 1/1986 | Maeda | |
| 4,646,894 A * | 3/1987 | Kamio | B60K 17/02 |
| | | | 192/113.5 |
| 6,561,331 B1 * | 5/2003 | Sola | F16D 67/04 |
| | | | 192/13 R |
| 6,763,923 B1 | 7/2004 | Okamuro et al. | |
| 2001/0053732 A1 * | 12/2001 | Nishimura | B60W 30/18 |
| | | | 477/70 |
| 2004/0007125 A1 * | 1/2004 | Stobrawe | F15B 15/2861 |
| | | | 92/5 R |
| 2004/0055849 A1 * | 3/2004 | Doremus | F16D 25/085 |
| | | | 192/85.51 |
| 2006/0113155 A1 | 6/2006 | Smith et al. | |

FOREIGN PATENT DOCUMENTS

| | | |
|---|---|---|
| DE | 102012220496 A1 | 5/2014 |
| DE | 102016209561 * | 12/2017 |
| FR | 2585791 B1 | 1/1990 |
| GB | 862409 A | 3/1961 |
| GB | 2053405 A | 2/1981 |
| GB | 2323906 A | 10/1998 |
| JP | H10305399 A | 11/1998 |

OTHER PUBLICATIONS

Extended European Search Report, dated Jul. 20, 2020, in corresponding European Patent Application No. 20178655.5.
China Office Action dated Jul. 29, 2020 in corresponding China Application No. 201780033372.6, 6 pages.

* cited by examiner

CLUTCH ACTUATING ARRANGEMENT

TECHNICAL FIELD

The present invention relates to a clutch arrangement of a vehicle transmission. The invention also relates to valve unit and a pneumatically controlled actuator arrangement. The invention is applicable on vehicles, in particularly low, medium and heavy duty vehicles commonly referred to as trucks. Although the invention will mainly be described in relation to a truck, it may also be applicable for other type of vehicles such as e.g. working machines, buses, etc.

BACKGROUND

Each of US2001/030097 and US2001/030096 discloses an actuating device for a friction clutch, provided with a clutch valve unit comprising an actuating valve and a measuring sensor, wherein the clutch valve unit is arranged through an opening in the clutch housing and can be removed there through. In US2001/030097, the connection of the clutch valve unit appears to be arranged inside the clutch housing. In US2001/030096 it is disclosed that the clutch valve unit is connected from outside the clutch housing.

Although US2001/030097 and US2001/030096 present solutions for a clutch valve, there is still room for improvements when developing clutch valve units and clutch actuator arrangements in terms of functionality and simplification during assembly thereof.

SUMMARY

It is thus an object of the present invention to provide a clutch arrangement which at least partially overcomes the above described deficiencies. This is achieved by a clutch arrangement according to claim 1.

According to a first aspect of the present invention, there is provided a clutch arrangement of a vehicle transmission arrangement, the clutch arrangement being positioned within a clutch bell housing of the vehicle transmission and comprising a pneumatically controlled actuator arrangement connectable to a first clutch unit of the vehicle transmission arrangement and arranged to controllably position the first clutch unit between a closed position and an opened position, a pneumatically controlled brake actuator arrangement connectable to a second clutch unit of the transmission arrangement and arranged to controllably position the second clutch unit between a closed position and an opened position, and a valve unit connected to the pneumatically controlled actuator arrangement and the pneumatically controlled brake actuator arrangement, wherein the valve unit comprises a clutch valve arranged in fluid communication with the pneumatically controlled actuator arrangement for controlling supply of compressed air to the pneumatically controlled actuator arrangement, and a brake valve arranged in fluid communication with the pneumatically controlled brake actuator arrangement for controlling supply of compressed air to the pneumatically controlled brake actuator arrangement.

The above described valve unit is thus provided with valves for controlling the flow of compressed air to the pneumatically controlled actuator arrangement as well as to the pneumatically controlled brake actuator arrangement. An advantage is thus that a single valve unit is provided for controlling two different actuator arrangements. Hereby, a total reduction of valve unit size can be achieved which may be of substantial benefit in the relatively tight space within the clutch bell housing. Furthermore, positioning the valve unit within the clutch bell housing enables for a valve positioned close to the actuator whereby the need of relatively long piping is reduced. This will also provide for a more rapid and accurate control of the pneumatically controlled actuator arrangement and the pneumatically controlled brake actuator arrangement. Furthermore, as the valve unit for controlling the brake actuator arrangement has been positioned within the clutch bell housing, more space is available outside the clutch bell housing. A further advantage is increased serviceability, since the brake valve can be more easily serviced as the valve unit is more easily accessible and therefore the brake valve is also easier to dismount.

According to an example embodiment, the valve unit may be connected to a stationary portion of the pneumatically controlled actuator arrangement. The stationary portion may be a housing of the pneumatically controlled actuator arrangement.

According to an example embodiment, the pneumatically controlled actuator arrangement may be arranged to control a first clutch unit positioned between an output shaft of a prime mover and an input shaft of the vehicle transmission.

According to an example embodiment, the pneumatically controlled brake actuator arrangement may be arranged to control a second clutch unit positioned between a transmission shaft and the clutch bell housing of the vehicle transmission arrangement.

According to an example embodiment, the pneumatically controlled actuator arrangement may comprise a clutch sensor for determining an openness degree of the first clutch unit.

According to an example embodiment, the valve unit may comprise a clutch openness receiver, the clutch openness receiver being connected to the clutch sensor and arranged to receive a signal from the clutch sensor indicative of the openness degree of the first clutch unit.

The clutch openness receiver should thus be understood to mean a device which receives a signal from the clutch sensor for receiving information of the openness degree of the first clutch unit. Hereby, and as described below, the clutch valve can be controlled based on the openness degree of the first clutch unit.

According to an example embodiment, the valve unit may be connected to the pneumatically controlled brake actuator arrangement via a brake pneumatic interface comprising a pneumatic conduit between the brake valve and the pneumatically controlled brake actuator arrangement.

According to an example embodiment, the brake pneumatic interface may comprise a sealing arrangement for preventing compressed air to leak from the brake pneumatic interface portion when the pneumatically controlled brake actuator arrangement is connected to the valve unit.

According to an example embodiment, the clutch openness receiver may be arranged to control the clutch valve based on the received signal from the clutch sensor.

According to an example embodiment, the clutch sensor may comprise a magnet for determining the openness degree of the first clutch unit.

According to an example embodiment, the clutch openness receiver may comprise an inductive receiver arranged to receive an inductive signal from the clutch sensor.

According to a second aspect, there is provided a valve unit for controlling the flow of pressurized air to a pneumatically controlled actuator arrangement and a pneumatically controlled brake actuator arrangement of a vehicle transmission arrangement, the valve unit being connectable to a source of pressurized air and comprises a clutch valve arranged to be provided in fluid communication with the pneumatically controlled actuator arrangement for controlling supply of compressed air to the pneumatically controlled actuator arrangement, and a brake valve arranged to be provided in fluid communication with the pneumatically controlled brake actuator arrangement for controlling supply of compressed air to the pneumatically controlled brake actuator arrangement.

According to an example embodiment, the valve unit may further comprise a clutch openness receiver arranged to be connected to a clutch sensor of the pneumatically controlled actuator arrangement for receiving a signal indicative of an openness degree of the first clutch unit.

According to an example embodiment, the valve unit may further comprise guiding means for being guidable to a connected position at the pneumatically controlled actuator arrangement. Hereby, simplified assembling of the valve unit and the pneumatically controlled actuator arrangement is achieved.

Further effects and features of the second aspect are largely analogous to those described above in relation to the first aspect.

According to a third aspect, there is provided a pneumatically controlled actuator arrangement of a vehicle transmission arrangement, the actuator arrangement being connectable to a first clutch unit of the vehicle transmission arrangement and arranged to controllably position the first clutch unit between a closed position and an opened position, the actuator arrangement being connectable to a valve unit arranged to controllably supply pressurized air to the actuator arrangement, wherein the actuator arrangement comprises an interface portion for connection to the valve unit, the interface portion comprises a mechanical interface portion and a pneumatic interface portion, wherein the mechanical interface portion comprises guiding means for guiding a portion of the valve unit for connection to the actuator arrangement.

An advantage of the interface portion is that simplified assembly of the valve unit to the pneumatically controlled actuator arrangement is provided. Thus, there is reduced need of visually determining that the clutch unit is connected to the pneumatically controlled actuator arrangement in a correct manner.

It should be readily understood that the first clutch unit may be positioned in a slipping state as well as the opened and closed positions.

According to an example, the pneumatic interface portion may comprise at least one conduit arranged to connect to a valve conduit of the valve unit for fluidly connecting the pneumatically controlled actuator arrangement to a clutch valve of the valve unit.

Hereby, also the pneumatic conduits can be easily connected between the valve unit and the pneumatically controlled actuator arrangement.

According to an example, the guiding means may comprise a guiding pin extending from the interface portion and arranged to be positioned in an opening of the portion of the valve unit, wherein the guiding pin has an extension from the interface portion which is larger than an extension of the at least one conduit of the pneumatic interface portion.

The guiding pin can be arranged as an elongated pin of various dimensions. The pin can also be provided with elongated recesses for connection to elongated protrusions of the opening in the valve unit, or vice versa. The opening in the valve unit should thus be arranged in such a shape as to be able to receive the guiding pin.

An advantage of providing a guiding pin which extends further out from the interface portion in comparison to the extension of the at least one conduit of the pneumatic interface portion is that once the guiding pin is in correct position, the pneumatic interface portion will also be provided in a correct position.

According to an example embodiment, the pneumatic interface portion may comprise a sealing arrangement for preventing compressed air to leak from the interface portion when the pneumatically controlled actuator arrangement is connected to the valve unit.

Hereby, a reduced risk of leakage of compressed air is provided.

According to an example embodiment, the pneumatically controlled actuator arrangement may further comprise a magnet sensor arranged to determine an openness degree of the first clutch unit.

Further effects and features of the third aspect are largely analogous to those described above in relation to the first and second aspect of the present invention.

According to a fourth aspect, there is provided a vehicle comprising a vehicle transmission arrangement, wherein the vehicle transmission arrangement comprises a clutch arrangement according to any one of the example embodiments described above in relation to the first aspect.

Effects and features of the fourth aspect are largely analogous to those described above in relation to the first, second and third aspects.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

Figure 1:
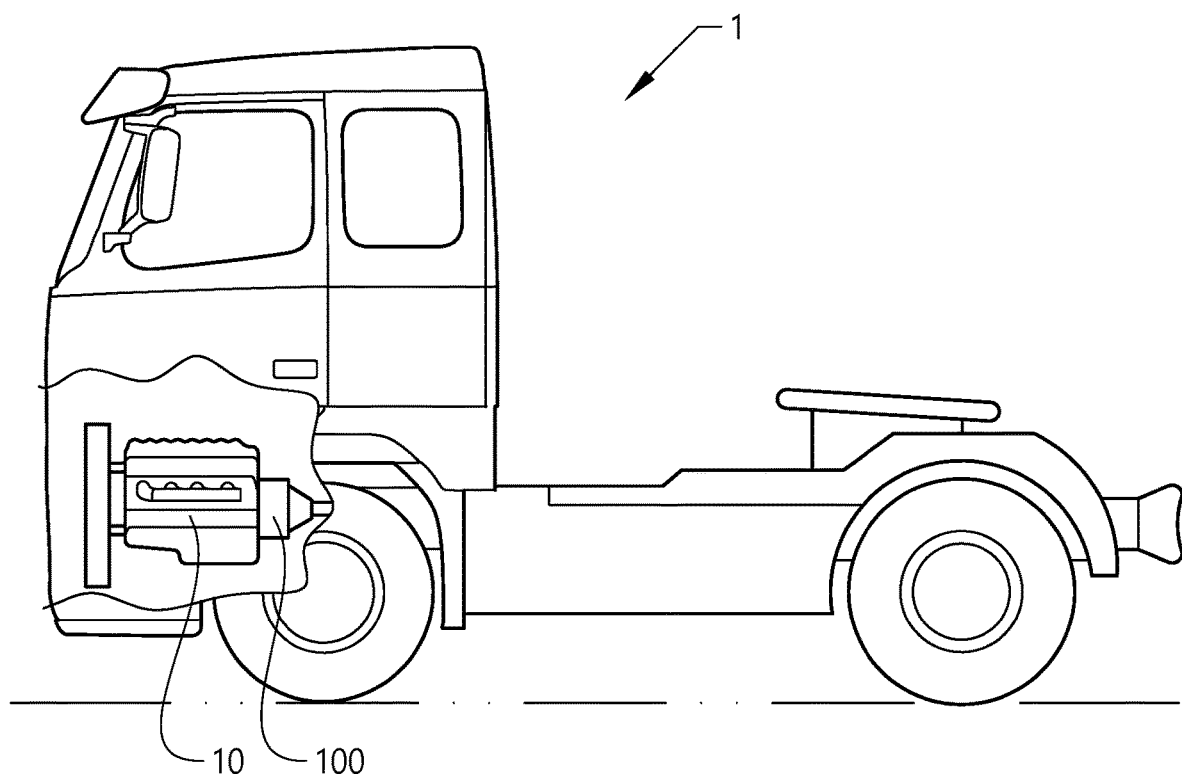
FIG. 1 is a lateral side view illustrating an example embodiment of a vehicle in the form of a truck.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 1 with a prime move 10 and a transmission arrangement 100 comprising a valve unit (302, FIG. 3), a pneumatically controlled actuator arrangement (208, FIG. 2) and a pneumatically controlled brake actuator arrangement (210, FIG. 2) according to the present invention. The vehicle 1 depicted in FIG. 1 is a truck for which the inventive transmission arrangement 100, as will be described further below, is particularly suitable for.

Figure 2:
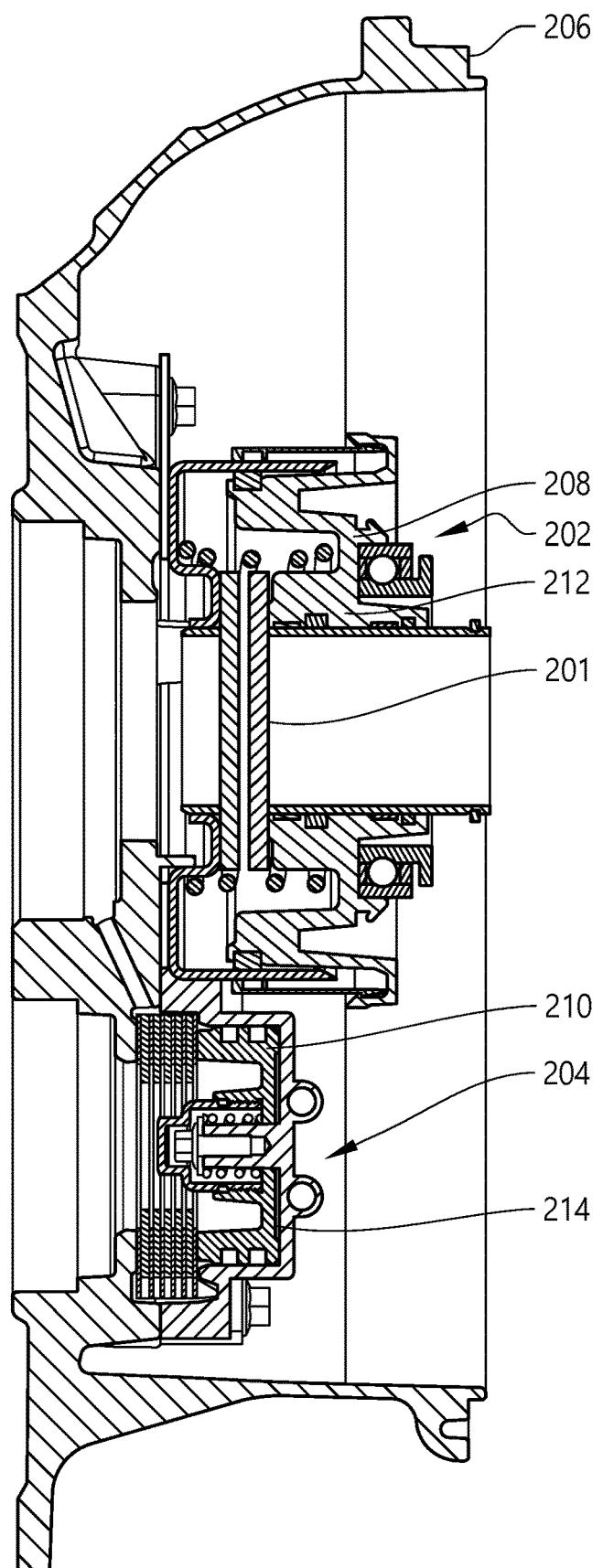
FIG. 2 is a cut-out side view illustrating clutch arrangements in the form of a clutch and a braking mechanism arranged within a clutch bell housing of a transmission according to an example embodiment.

Turning to FIG. 2, which is a cut-out side view illustrating clutch arrangements in the form of a first clutch unit 202 and a second clutch unit 204. The first clutch unit 202 will in the following be referred to as a clutch 202, and the second clutch unit 204 will in the following be referred to as a braking mechanism 204. The clutch 202 comprises friction clutch elements 201. It should be noted that the friction clutch elements 201 are schematically illustrated. The purpose of the friction clutch elements 201 is to engage and disengage an output shaft (not shown) of the prime mover 10 to an input shaft (not shown) of the transmission 100. The braking mechanism 204 has for its primary purpose to reduce the rotational speed of a shaft. The clutch 202 and the braking mechanism 204 are arranged within a clutch bell housing 206 of the transmission 100, whereby the clutch 202 is, as described above, arranged to controllably interconnect the output shaft (not shown) of the prime mover 10 to the input shaft (not shown) of the transmission 100. The braking arrangement 204 on the other hand is arranged to controllably brake a counter shaft (not shown) of the transmission 100 to the clutch housing 206. The counter shaft may also be referred to as a lay shaft.

Moreover, the transmission 100 also comprises a pneumatically controlled actuator arrangement for the clutch 202 and a pneumatically controlled brake actuator arrangement for the braking arrangement 204. The pneumatically controlled actuator arrangement for the clutch 202 will in the following also simply be referred to as the clutch actuator arrangement 208, and the pneumatically controlled brake actuator arrangement for the braking mechanism 204 will in the following also simply be referred to as the braking actuator arrangement 210. The clutch 202 and the braking mechanism 204 further comprises a respective compressed-air piston 212, 214 which are each arranged to mechanically control the motion of the clutch 202 and the braking mechanism 204.

The clutch 202 is a normally closed clutch, i.e. it is continuously connecting the output shaft of the prime mover 10 to the input shaft of the transmission 100 until the clutch actuator arrangement 208 controllably positions it in an opened state. Hence, when providing compressed air to the clutch actuator arrangement 208, the clutch actuator arrangement 208 will eventually position the clutch 202 in an open position disconnecting the output shaft of the prime mover 10 from the input shaft of the transmission 100.

The braking arrangement 204 is a normally opened braking arrangement, i.e. it is disconnecting the counter shaft from the clutch housing 206 until the braking actuator arrangement 210 controllably positions the braking arrangement 204 in a closed position which reduces the rotational speed of the counter shaft relative to the clutch housing 206. Hence, when providing compressed air to the braking actuator arrangement 210, the braking actuator arrangement 210 positions the braking arrangement 204 in a closed state for reducing the rotational speed of the counter shaft relative to the clutch housing 206.

Figure 3:
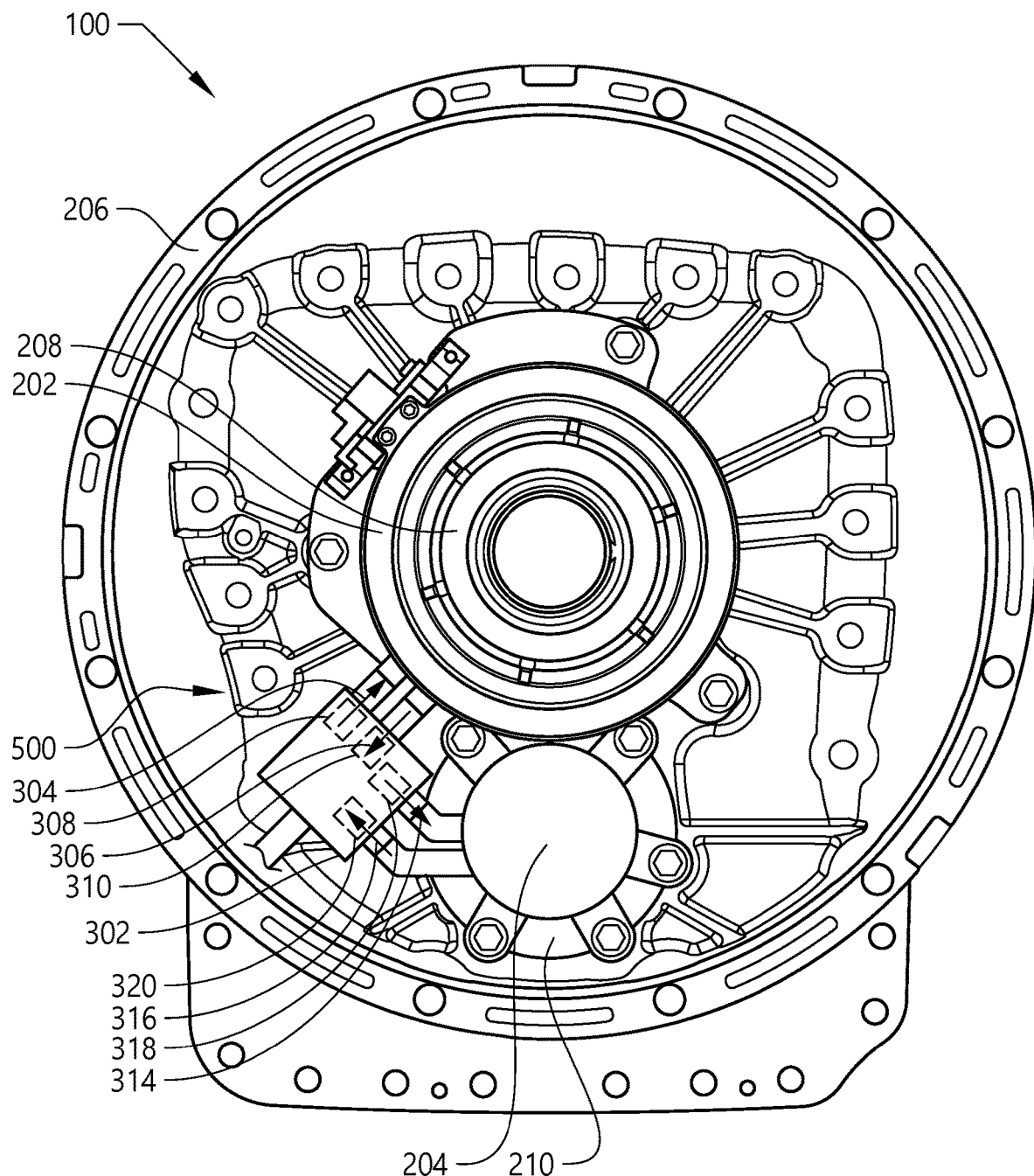
FIG. 3 illustrates a valve unit connected to a pneumatically controlled actuator arrangement and to a pneumatically controlled brake actuator arrangement according to an example embodiment.

FIG. 3 is a view to the rear of the transmission 100, and in particular, a view of the clutch arrangement 500. As can be seen in FIG. 3, the clutch 202 and the braking arrangement 204 described above in relation to FIG. 2 are illustrated. According to the embodiment depicted in FIG. 3, a valve unit 302 is connected to the clutch actuator arrangement 208 and to the braking actuator arrangement 210. The valve unit 302 is arranged for controlling the flow of compressed air into and out from the clutch actuator arrangement 208 and the braking actuator arrangement 210. The valve unit 302 is thus arranged in fluid communication with a pneumatic tank or the like of the vehicle for supply of compressed air. In detail, the valve unit 302 is mechanically and pneumatically connected to the clutch actuator arrangement 208 and mechanically and pneumatically connected to the braking actuator arrangement 210. Hereby, the valve unit 302 can be connected to the clutch actuator arrangement 208 via a mechanical interface for proper attachment thereto, as well as via a pneumatic interface for proper delivery of compressed air to the clutch actuator arrangement 208. Likewise, the valve unit 302 can be connected to the braking actuator arrangement 210 via a mechanical interface for proper attachment thereto, as well as via a pneumatic interface for proper delivery of compressed air to the braking actuator arrangement 210. The mechanical and pneumatic interface between the valve unit 302 and the clutch actuator arrangement 208 is described in further detail below with reference to the description of FIG. 4.

Furthermore, the valve unit 302 comprises clutch valves 308, 310 for controlling the flow of compressed air to/from the clutch actuator arrangement 208, and brake valves 318, 320 for controlling the flow of compressed air to/from the braking actuator arrangement 210. In detail, the clutch unit 302 comprises an inlet clutch valve 308 for controlling the flow of compressed air into the actuator arrangement 208 and an outlet clutch valve 310 for controlling the flow of compressed air out from the actuator arrangement 208, and an inlet brake valve 318 for controlling the flow of compressed air into the braking actuator arrangement 210 and an outlet brake valve 320 for controlling the flow of compressed air out from the braking actuator arrangement 210. The flow of compressed air directed into the clutch actuator arrangement 208 is depicted with an arrow denoted as 304, while the flow of compressed air directed out from the clutch actuator arrangement 208 is depicted with an arrow denoted as 306. Similarly, the flow of compressed air directed into the braking actuator arrangement 210 is depicted with an arrow denoted as 314, while the flow of compressed air directed out from the braking actuator arrangement 210 is depicted with an arrow denoted as 316.

The valve unit 302 is preferably an electrically controlled valve unit 302 which is connected to a control unit of the transmission or vehicle for controlling the opening/closing of the inlet valve 308 and the outlet valve 310, as well as the inlet brake valve 318 and the outlet brake valve 320. It should also be readily understood that the inlet valve 308 and the outlet valve 310 can also be one and the same valve. Likewise, the inlet brake valve 318 and the outlet brake valve 320 can also be one and the same valve.

Figure 4:
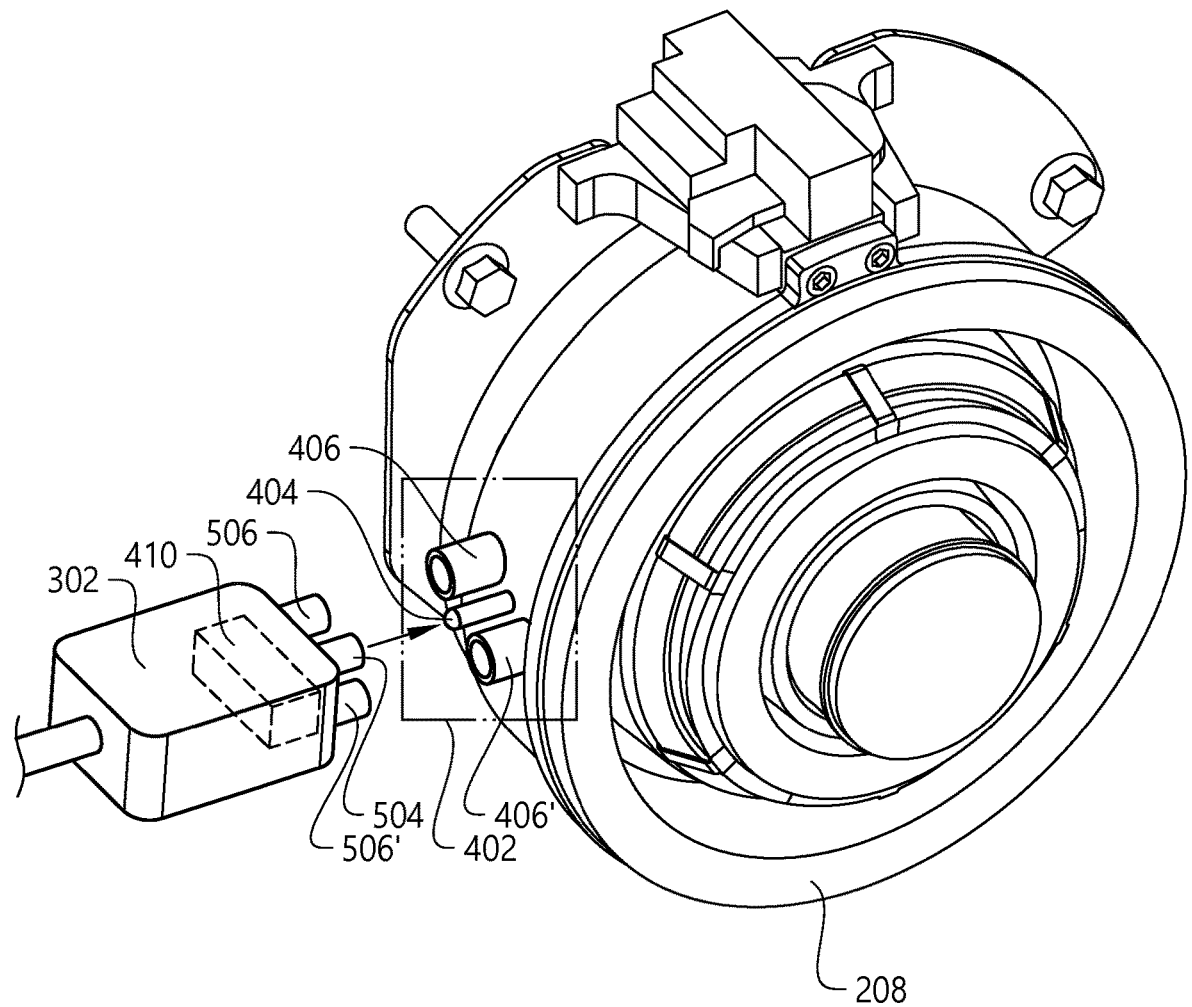
FIG. 4 is an exploded view illustrating an interface portion between the valve unit and the pneumatically controlled actuator arrangement according to an example embodiment.

The valve unit 302 and the clutch actuator arrangement 208 are connected to each other at an interface portion 402 of the clutch actuator arrangement 208. Reference is therefore made to FIG. 4, in which the valves described above are omitted from the valve unit 302. The interface portion 402 comprises a mechanical interface portion 404 and a pneumatic interface portion 406, 406'. Likewise, the valve unit 302 comprises a mechanical valve interface portion 504 and a pneumatic valve interface portion 506, 506'. Hereby, the mechanical interface portion 404 of the clutch actuator arrangement 208 is arranged to be connected to the mechanical valve interface portion 504 of the valve unit 302, and the pneumatic interface portion 406, 406' of the clutch actuator arrangement 208 is arranged to be connected to the pneumatic valve interface portion 506, 506' of the valve unit 302.

As can be seen in FIG. 4, the pneumatic interface portion 406, 406' of the clutch actuator arrangement 208 and the pneumatic valve interface portion 506, 506' of the valve unit 302 are arranged as respective conduits connectable to each other. The pneumatic interface portion may also comprise a sealing arrangement for preventing leakage of compressed air there between.

According to the example embodiment depicted in FIG. 4, the mechanical interface portion 404 of the clutch actuator arrangement 208 may be arranged as a pin. The pin is arranged to be connected to a hole of the mechanical valve interface portion 504 of the valve unit 302. The hole is preferably arranged as a socket, such that a pin and socket connection is provided for mechanically connecting the clutch actuator arrangement 208 and the valve unit 302 to each other. The pin 404 is preferably extending further away from the clutch actuator arrangement 208 in comparison to the conduits of the pneumatic interface portion 406, 406'. Although a pin and socket connection is been described and depicted in FIG. 4, other alternatives are also conceivable.

Furthermore, the valve unit 302 comprises a clutch openness receiver 410. The clutch openness receiver 410 is arranged to receive a signal from a sensor (not shown) of the pneumatically controlled actuator arrangement 208 for determining the openness degree of the clutch, i.e. if the clutch is closed or opened, and to which extent it is opened. The clutch valves 308, 310 can thereafter be controlled accordingly.

According to an alternative description of the invention which can be used in combination with the above description of FIGS. 1-4, the vehicle comprises a powertrain where the invention can be implemented. The vehicle can be of different types, such as a truck, a bus or a car comprising an actuating device for a friction clutch. The powertrain can be of traditional type or a hybrid, such as a hybrid electric vehicle.

According to an embodiment, an actuating device is arranged in a powertrain comprising a propulsion unit, clutch and transmission. The actuating device for a friction clutch is arranged in a clutch bell housing in the power train of the vehicle. The friction clutch is arranged between a propulsion unit and a transmission of the powertrain. The propulsion unit can be an internal combustion engine or an electric motor. The transmission comprises a transmission input shaft drivingly connected via different selectable and engageable gear steps (gear ratios) to a transmission output shaft. The transmission output shaft is arranged to drive wheels of the vehicle. A control unit is arranged to control the transmission, the clutch and the propulsion unit in order to perform gearshifts according to known art. A gear selector lever is arranged to selected different control modes (automatic, manual etc.) of the transmission.

Furthermore, a shaft brake is arranged in the clutch bell housing and is configured to brake a shaft in the transmission, and where a second valve arrangement (shaft brake valve) is arranged to control a flow of a shaft brake actuating medium.

The actuating device comprises a clutch release mechanism, movable along substantially the same axis as the friction clutch, for actuating the friction clutch. Further, it is provided a servo positioning arrangement with a pressure medium power cylinder arrangement (CCA) with a pressure medium annular cylinder substantially concentric to the clutch axis arranged inside the clutch bell housing and designed to exert force substantially coaxial to the clutch axis on the clutch release mechanism.

A clutch valve unit (CVU) is connected to a pressure medium source and operating in dependence of a desired value representing a desired position of the clutch release mechanism and an actual value representing the axial position of the clutch release mechanism. A pressure medium conduit and an electric wire connect the control unit and the CVU. The same pressure medium conduit can be used to supply pressure medium to both the shaft brake and the clutch cylinder. Thus, electrical signal connection for the clutch travel sensor, pressure medium connection for the shaft brake actuating medium and the clutch actuating medium are attached from the outside of the clutch bell housing to the CVU.

Furthermore, the shaft brake comprises a brake cylinder, where the second valve arrangement is arranged to control the shaft brake actuating medium to actuate the brake cylinder. The shaft brake is arranged to brake the shaft in order to adapt rotational speed of the shaft. In the disclosed configuration the shaft is a lay shaft (counter shaft).

Moreover, the clutch valve unit (CVU) comprises a first valve arrangement for controlling the flow of a clutch actuating medium. Further, a clutch travel sensor (clutch openness receiver) is arranged to measure the actual value representing the axial position of the clutch release mechanism, and where the sensor is arranged for detecting a position of a movable part of the clutch release mechanism.

The clutch bell housing comprises a recess for the clutch valve unit (CVU) and where the clutch valve unit (CVU) is arranged to be connected to a stationary part of the CCA. The recess for the clutch valve unit (CVU) is configured such that the clutch valve unit (CVU) is positioned on the stationary part of the CCA from the outside through the recess of the clutch bell housing and detachably connected to the stationary part. The CVU can for example be fastened to the stationary part of the CCA and/or to the clutch bell housing in order to be connected to the stationary part of the CCA.

Moreover, the clutch travel sensor is integrated in the CVU. According to an example embodiment, a travel sensor magnet rotation stop can be arranged in the CVU.

Further, the second valve arrangement (shaft brake valve) for controlling the shaft brake is also integrated in the CVU such that when the CVU has to be detached from the clutch bell housing the first and the second valve arrangement and the clutch travel sensor follows with the CVU.

Thus, the relevant components are located inside the clutch bell housing in the clutch valve unit CVU, which in turn is in direct connection with the clutch concentric cylinder CCA.

An advantage is thus that an increased shaft brake performance is achieved, since shorter path way for the actuating medium is provided between the shaft brake valve and the shaft brake cylinder. A further advantage is increased serviceability, since the shaft brake valve can be more easily serviced as the clutch valve unit CVU is more easily accessible and therefore the shaft brake valves are also easier to dismount.

With an arrangement according to the invention it is easier to perform maintenance of all the components integrated in the CVU and make the proper fail analysis without having to perform an expensive transmission disassembly, that is, detach the clutch bell housing from the propulsion unit of the vehicle.

According to a further embodiment, a pipe (for example a "pneumatic air interface") is arranged to connect a conduit integrated in the housing of the CVU for conducting the shaft brake actuating medium to a corresponding conduit in the housing of the shaft brake in order to conduct the medium from the second valve arrangement (shaft brake valve) to the shaft brake cylinder.

According to a still further embodiment, the CVU and the shaft brake can be arranged adjacent to each other, such that a housing of the CVU is in direct contact with a housing of the shaft brake. This provides the possibility to have a conduit integrated in the housing of the CVU for conducting the shaft brake actuating medium to be directly connected to a corresponding conduit in the housing of the shaft brake in order to conduct the medium from the second valve arrangement to the shaft brake cylinder.

The integration of the shaft brake control valves into the CVU can accommodate both one 3/2 valve and/or two 2/2 valves to control the actuation of the brake cylinder.

For clarification, the following abbreviations have been used in the text.

CCA=Concentric clutch actuator
CVU=Clutch Valve unit

It is to be understood that the present invention is not limited to the embodiments described above and illustrated in the drawings; rather, the skilled person will recognize that many changes and modifications may be made within the scope of the appended claims.

The invention claimed is:

1. A valve unit for controlling the flow of pressurized air to a pneumatically controlled actuator arrangement and a pneumatically controlled brake actuator arrangement of a vehicle transmission arrangement, the valve unit being contained in a housing mounted on a first clutch unit or brake unit and connectable to a source of pressurized air and comprises a clutch valve arranged to be provided in fluid communication with the pneumatically controlled actuator arrangement for controlling supply of compressed air to the pneumatically controlled actuator arrangement, and a brake valve arranged to be provided in fluid communication with the pneumatically controlled brake actuator arrangement for controlling supply of compressed air to the pneumatically controlled brake actuator arrangement, and a clutch openness receiver arranged to be connected to a clutch sensor of the pneumatically controlled actuator arrangement for receiving a signal indicative of an openness degree of the first clutch unit positioned between an output shaft of a prime mover and an input shaft of the vehicle transmission.

2. The valve unit of claim 1, wherein a clutch arrangement is positioned within a clutch bell housing of the vehicle transmission arrangement, the clutch arrangement comprising: the pneumatically controlled actuator arrangement connectable to the first clutch unit of the vehicle transmission arrangement and arranged to controllably position the first clutch unit between a closed position and an opened position, the pneumatically controlled brake actuator arrangement connectable to a second clutch unit of the transmission arrangement and arranged to controllably position the second clutch unit between a closed position and an opened position.

3. The valve unit according to claim 2, wherein the valve unit is connected to a stationary portion of the pneumatically controlled actuator arrangement.

4. The valve unit according to claim 2, wherein the pneumatically controlled brake actuator arrangement is arranged to control the second clutch unit positioned between a transmission shaft and the clutch bell housing of the vehicle transmission arrangement.

5. The valve unit according to claim 2, wherein the pneumatically controlled actuator arrangement comprises a clutch sensor for determining an openness degree of the first clutch unit.

6. The valve unit according to claim 5, wherein the valve unit comprises a clutch openness receiver, said clutch openness receiver being connected to the clutch sensor and arranged to receive a signal from the clutch sensor indicative of the openness degree of the first clutch unit.

7. The valve unit according to claim 6, wherein the clutch openness receiver is arranged to control the clutch valve based on the received signal from the clutch sensor.

8. The valve unit according to claim 5, wherein the clutch sensor comprises a magnet for determining the openness degree of the first clutch unit.

9. The valve unit according to claim 6, wherein the clutch openness receiver comprises an inductive receiver arranged to receive an inductive signal from the clutch sensor.

10. The valve unit according to claim 2, wherein the valve unit is connected to the pneumatically controlled brake actuator arrangement via a brake pneumatic interface comprising a pneumatic conduit between the brake valve and the pneumatically controlled brake actuator arrangement.

11. The valve unit according to claim 10, wherein the brake pneumatic interface comprises a sealing arrangement for preventing compressed air to leak from the brake pneumatic interface portion when the pneumatically controlled brake actuator arrangement is connected to the valve unit.

12. The valve unit according to claim 1, further comprising guiding means for being guidable to a connected position at the pneumatically controlled actuator arrangement.

* * * * *